United States Patent
Bot et al.

(10) Patent No.: US 9,020,497 B2
(45) Date of Patent: Apr. 28, 2015

(54) METHOD OF ROUTING A CALL TO ONE OF A PLURALITY OF USER EQUIPMENT

(75) Inventors: Johannes Jan Bot, Nieuwendijk (NL); Antoine Den Brok, Rijen (NL); Fedor Maas, Molenschot (NL)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 358 days.

(21) Appl. No.: 13/392,757

(22) PCT Filed: Sep. 11, 2009

(86) PCT No.: PCT/NL2009/050548
§ 371 (c)(1),
(2), (4) Date: Mar. 27, 2012

(87) PCT Pub. No.: WO2011/031133
PCT Pub. Date: Mar. 17, 2011

(65) Prior Publication Data
US 2012/0178459 A1    Jul. 12, 2012

(51) Int. Cl.
*H04Q 7/00* (2006.01)
*H04W 40/20* (2009.01)
*H04W 84/04* (2009.01)

(52) U.S. Cl.
CPC ............ *H04W 40/20* (2013.01); *H04W 84/045* (2013.01)

(58) Field of Classification Search
CPC ................................. H04W 8/28; H04W 8/26
USPC .............. 455/426.1, 432.1, 404.1, 412.2, 444
See application file for complete search history.

(56) References Cited

U.S. PATENT DOCUMENTS

2004/0203680 A1* 10/2004 Sylvain ......................... 455/417
2007/0153768 A1    7/2007 Jagadesan et al.

FOREIGN PATENT DOCUMENTS

FR         1804435 A1 *  7/2007
JP      H11355828 A    12/1999
WO         0219750 A1   3/2002

* cited by examiner

Primary Examiner — Ajit Patel
Assistant Examiner — Julio Perez
(74) Attorney, Agent, or Firm — Coats & Bennett, PLLC

(57) ABSTRACT

Method of routing a call to one of a plurality of user equipment of a UMA/GAN-subscriber in a telecommunications network. The telecommunications network comprises a service control entity. Said service control entity determines whether said UMA/GAN-subscriber is within or outside a home area. The service control entity comprises a first indicator indicating at least one network address of a user equipment comprised by the plurality of user equipment to which the call is to be routed in case the UMA/GAN-subscriber is within the home area, and a second indicator indicating at least one network address of a user equipment comprised by the plurality of user equipment to which the call is to be routed in case the UMA/GAN-subscriber is outside the home area.

15 Claims, 6 Drawing Sheets

METHOD OF ROUTING A CALL TO ONE OF A PLURALITY OF USER EQUIPMENT

TECHNICAL FIELD

The present invention relates to a method of routing a call to one of a plurality of user equipment associated to an Unlicensed Mobile Access (UMA) Global Access Networks (GAN)-subscriber in a telecommunications network, wherein each user equipment has a corresponding network address and one of the network addresses corresponds to a UMA/GAN mobile user equipment comprised by the plurality of user equipment. The present invention also relates to a service control entity and a telecommunications network arranged to execute (part of) the method.

BACKGROUND

Recently, mobile telephone services were introduced wherein a subscriber only needs one single mobile phone that is suitable for calling via Voice Over IP (VOIP) and via a mobile telecommunications network such as Global System for Mobile Communications (GSM), Universal Mobile Telecommunications System (UMTS), High Speed Packet Access (HSPA), Long Term Evolution (LTE) or the like. If the subscriber resides within a predetermined home area, e.g. at home, he may call via a radio based connection such as Wireless Local Area Network (WLAN), WIFI (or other IEEE 802.11 compatible connections), or Bluetooth. These radio based connections are collectively denoted as UMA (Unlicensed Mobile Access). GSM, UMTS, HSPA, LTE and the like are denoted as GAN (Global Access Networks). Phones capable of connection in both UMA and GAN are denoted as UMA/GAN phones. For a subscriber to use the phones capabilities he needs to have either GAN and UMA subscriptions or a combined UMA/GAN subscription. Below, it is assumed that a subscriber has a combined UMA/GAN subscription. Such a subscriber is referred to as a UMA/GAN-subscriber.

Nowadays UMA/GAN-subscribers may have the possibility to make 'calls for free' with a UMA/GAN mobile telecommunications device, when inside the home area, e.g. when calling via Voice Over Internet Protocol (VOIP). These VOIP calls may be charged by a monthly fee for IP (Internet Protocol) access.

When a subscriber has a UMA-Fixed subscription having both a UMA/GAN mobile telecommunications device and a fixed telecommunications device, each having a unique telephone number, it is also possible to receive calls that are set-up to the fixed (geographical) number of the fixed telecommunications device on the UMA/GAN mobile telecommunications device number in case the UMA/GAN mobile telecommunications device associated with the UMA/GAN-subscriber associated with this fixed number is within Wireless Local Area Network (WLAN) coverage (UMA Fixed). Hence it is possible to route calls made to one of a plurality of telephone numbers to a UMA/GAN mobile telecommunications device, where the UMA/GAN mobile telecommunications device can be used as a 'one phone concept'.

SUMMARY

In general, it is an object of the present invention to provide more versatility to an Unlicensed Mobile Access/Global Access Networks (UMA/GAN)-subscriber and/or a telecommunications services provider. Thereto, according to the invention, is provided a method of routing a call to one of a plurality of user equipment, the plurality of user equipment being associated to a UMA/GAN-subscriber in a telecommunications network, wherein each user equipment has a corresponding network address and one of the network addresses corresponds to an UMA/GAN mobile user equipment comprised by the plurality of user equipment, wherein a service control entity comprised by the telecommunications network performs the steps of storing a list associated with said UMA/GAN-subscriber, said list comprising a home area cell identifier representing a cell area overlapping a predetermined home area associated with said UMA/GAN-subscriber; receiving location information relating to a location of said UMA/GAN mobile user equipment, such as a serving cell identifier of a cell serving said UMA/GAN mobile user equipment; determining whether said UMA/GAN mobile user equipment is located within the home area or outside the home area; wherein said list further comprises a first indicator indicating at least one network address of a user equipment comprised by the plurality of user equipment to which the call is to be routed in case the UMA/GAN mobile user equipment is determined to be within the home area, and a second indicator indicating at least one network address of a user equipment comprised by the plurality of user equipment to which the call is to be routed in case the UMA/GAN mobile user equipment is determined to be outside the home area; wherein the method further comprises the step of routing the call to the user equipment according to the first indicator in case the mobile user equipment is determined to be within the home area, or according to the second indicator in case the mobile user equipment is determined to be outside the home area.

Optionally, the service control entity is further arranged such that the first indicator and/or the second indicator can be controlled, set and/or modified, e.g. by the UMA/GAN-subscriber.

This provides the advantage that the call to the one of the plurality of user equipment may be routed to any one(s) of the plurality of user equipment. Further versatility is provided in that the first and second indicators can be controlled, set and/or modified within the service control entity.

It is possible that a first network address, e.g. a first telephone number, is associated with a fixed telecommunications device, i.e. a fixed user equipment, of said UMA/GAN-subscriber, a second network address, e.g. a second telephone number, is associated with a UMA/GAN mobile telecommunications device, i.e. a UMA/GAN mobile user equipment, of said UMA/GAN-subscriber, and optionally a third network address is associated with a UMA client associated with a IP (Internet Protocol) Multimedia Subsystems (IMS)/Session Initiation Protocol (SIP) device of said UMA/GAN-subscriber.

It is possible that the service control entity comprises a user interface, and the method comprises controlling, setting and/or modifying the first and/or second indicator by means of the user interface. Thus it is possible, e.g. for the telecommunications service provider and/or for the UMA/GAN-subscriber to modify to which one(s) of the plurality of user equipment the call is to be routed, if desired, independently for the cases when the UMA/GAN mobile user equipment is determined to be inside or outside the home area, respectively. The UMA/GAN-subscriber may for instance set the first and second indicators such that a call to any one of the plurality of user equipment is always routed to that user equipment that has the smallest costs associated therewith.

It is possible that the service control entity is arranged for automatically determining the first and/or second indicator on the basis of a rule. Such rule may for instance be that a call to any one of the plurality of user equipment is always routed to that user equipment that has the smallest costs associated therewith.

It is possible that the first and/or second indicator indicates to route the call to more than one user equipment of the plurality of the user equipment in parallel and/or sequentially. Thus, it is possible to have two or more of the user equipment ringing simultaneously when a call is made to only one of the user equipment. Whether or not parallel ringing is applied, and/or which user equipment ring in parallel may depend on whether the UMA/GAN mobile user equipment is determined to be inside or outside the home area.

The invention also relates to a service control entity for providing intelligent network services to a UMA/GAN-subscriber in a telecommunications network, the UMA/GAN-subscriber having a plurality of user equipment, wherein each user equipment has a corresponding network address and one of the network addresses corresponds to a UMA/GAN mobile user equipment comprised by the plurality of user equipment, said service control entity comprising a processing unit, an input unit connected to the processing unit and an output unit connected to the processing unit, wherein the processing unit is arranged for: storing a list associated with said UMA/GAN-subscriber, said list comprising a home area cell identifier representing a cell area overlapping a predetermined home area associated with said UMA/GAN-subscriber; receiving location information relating to a location of said UMA/GAN mobile user equipment, such as a serving cell identifier of a cell serving said UMA/GAN mobile user equipment; determining whether said UMA/GAN mobile user equipment is located within the home area or outside the home area; wherein said list further comprises a first indicator indicating at least one network address of a user equipment comprised by the plurality of user equipment to which the call is to be routed in case the UMA/GAN mobile user equipment is determined to be within the home area, and a second indicator indicating at least one network address of a user equipment comprised by the plurality of user equipment to which the call is to be routed in case the UMA/GAN mobile user equipment is determined to be outside the home area.

The invention further relates to a computer program product including software code portions arranged for performing, when run on a programmable apparatus, the steps of: storing a list associated with an UMA/GAN-subscriber, said list comprising a home area cell identifier representing a cell overlapping a predetermined home area associated with said UMA/GAN-subscriber, the UMA/GAN-subscriber having a plurality of user equipment, wherein each user equipment has a corresponding network address and one of the network addresses corresponds to a UMA/GAN mobile user equipment comprised by the plurality of user equipment, wherein said list further comprises a first indicator indicating at least one network address of a user equipment comprised by the plurality of user equipment to which a call made to one of the plurality of network addresses is to be routed in case the UMA/GAN mobile telecommunications device is determined to be within the home area, and a second indicator indicating at least one network address of a user equipment comprised by the plurality of user equipment to which a call made to one of the plurality of network addresses is to be routed in case the UMA/GAN mobile user equipment is determined to be outside the home area; receiving location information relating to a location of said UMA/GAN mobile user equipment, such as a serving cell identifier of a cell serving said UMA/GAN mobile user equipment, about said UMA/GAN mobile telecommunications device; determining whether said UMA/GAN mobile user equipment is located within the home area or outside the home area; and optionally allowing the first indicator and/or the second indicator to be controlled, set and/or modified.

The invention also relates to a data carrier including said computer program product of claim. Herein the data carrier may for instance comprise a magnetic data carrier, such as a hard disk, an optical data carrier, such as a compact disk (CD) or DVD, a solid state device data carrier, or carrier waves, such as available on an intranet or the internet.

Thus, the method according to the invention provides the advantage that it is possible to route an incoming calls to one of the user equipment of the subscriber via the cheapest or most efficient route, e.g. in case the receiver has to pay for the receiving part of the call. It is possible to route incoming calls (made to a certain user equipment corresponding to the unique network address called) to the fixed user equipment and the UMA/GAN mobile user equipment in parallel, e.g. when the subscriber is located within the home area. It is possible to route incoming calls made to the UMA/GAN mobile user equipment to the UMA Client at a Personal Computer (PC) or IP (Internet Protocol) Multimedia Subsystems/Session Initiation Protocol (IMS/SIP) phone of the subscriber when the UMA Client is active. For the originating calls, it is possible to display a certain common selected number (Calling Line Identification) when setting up a call with one of the plurality of user equipment. It is possible to route a missed call to one common Voicemail box in common for all user equipment of the subscriber.

BRIEF DESCRIPTION OF THE DRAWINGS

The invention will now be further elucidated by means of non-limiting examples referring to the drawing, in which.

DETAILED DESCRIPTION

Figure 1:
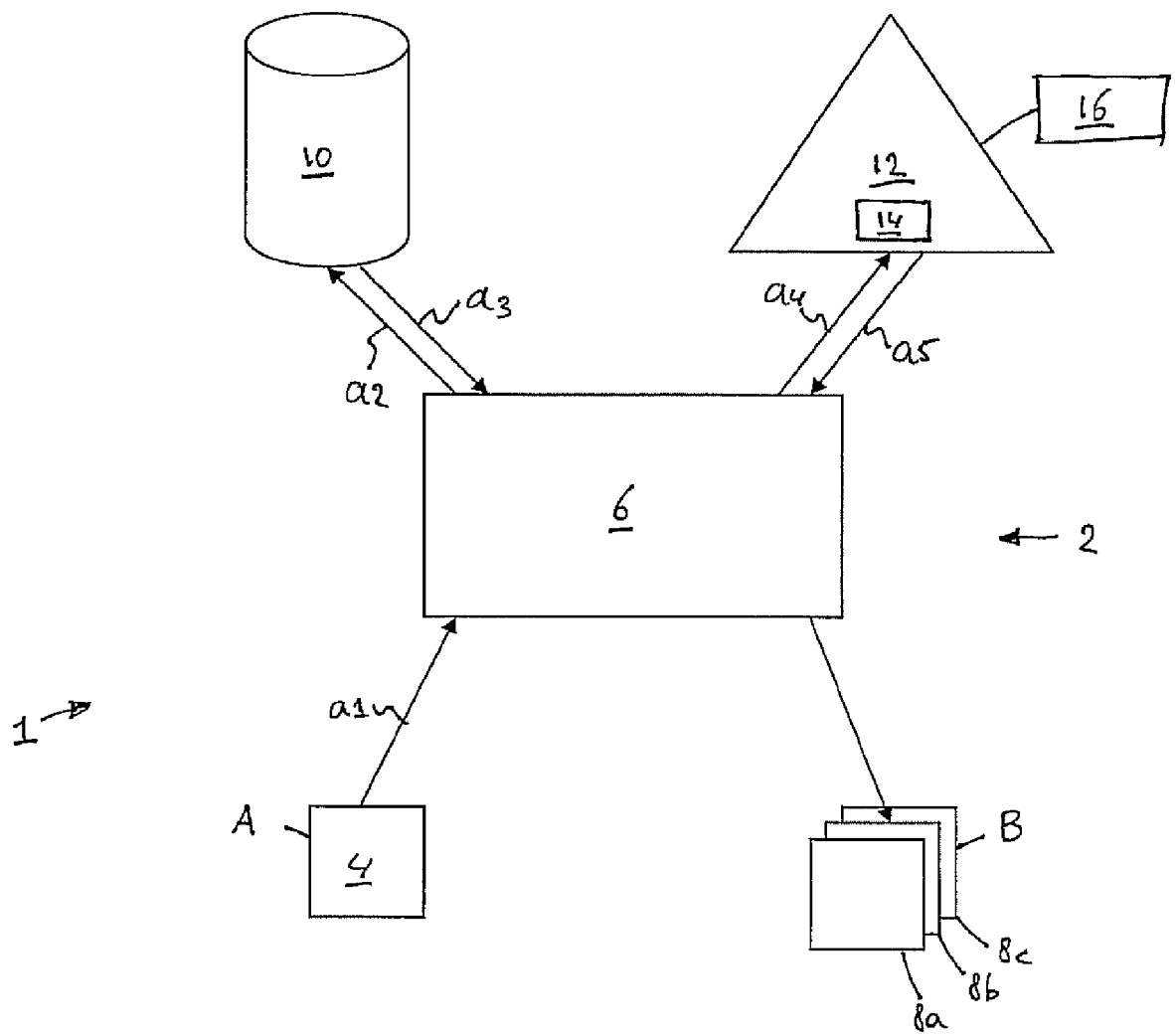
FIG. 1 shows a schematic representation of a system according to the invention.

FIG. 1 shows a schematic representation of a system 1 incorporating the invention. FIG. 1 shows a telecommunication network 2 comprising a calling party A user equipment 4, in this example a telecommunications device 4, and a Mobile Switching Centre (MSC) 6, acting as a switching node. In this telecommunications network, a called party B is present. The called party in this example is a Unlicensed Mobile Access/Global Access Networks (UMA/GAN)-subscriber, having a plurality of telecommunications devices associated with his UMA/GAN subscription.

In this example, the called party B has a plurality of user equipment. In this example, the plurality of user equipment comprises a fixed user equipment, here a fixed telecommunications device 8a (also referred to as UMA home phone), a UMA/GAN mobile user equipment, here a UMA/GAN mobile telecommunications device 8b (also referred to as UMA/GAN mobile device), and a user equipment comprising a UMA client associated with an IP (Internet Protocol) Multimedia Subsystems/Session Initiation Protocol (IMS/

SIP) device 8c. In this example, a first network address, here a first telephone number, is associated with the fixed telecommunications device 8a, a second network address, here a second telephone number, is associated with the UMA/GAN mobile telecommunications device 8b, and a third network address is associated with the UMA client associated with the IMS/SIP device 8c of said UMA/GAN-subscriber.

In this example, the calling party A will make a telephone call to one of the network addresses associated with one of the telecommunications devices 8a,8b,8c of the called party B.

In FIG. 1 the network 2, further comprises a Home Location Register (HLR) 10 acting as location server. In this example, the network 2 further comprises an Intelligent Network (IN) 12. The IN 12 acts as a service node. Here, the Intelligent Network 12 comprises a service control entity 14.

In the example of FIG. 1, the service control entity comprises a repository, storing a list associated with the called party B. The list comprises information representative of a home area of the called party B. Such information may e.g. comprise a home area cell identifier representing a cell area overlapping a predetermined home area associated with said called party B.

It will be appreciated that the called party B UMA/GAN-subscriber may be present within the home area, e.g. at home, or outside the home area. The network 2, may determine the location of the UMA/GAN-subscriber, e.g. by determining a location of the UMA/GAN mobile telecommunications device 8b, assuming this is carried by the UMA/GAN-subscriber. Thereto, the service control entity 14 may receive location information relating to a location of the UMA/GAN mobile telecommunications device 8b. The service control entity may e.g. receive a serving cell identifier of a cell serving said UMA/GAN mobile telecommunications device 8b from the HLR 10 or the MSC 6.

In this example, the list further comprises a first indicator indicating at least one network address of a user equipment 8a,8b,8c comprised by the plurality of user equipment to which a call made to the one of the plurality network addresses is to be routed in case the UMA/GAN mobile telecommunications device 8b is determined to be within the home area. In this example, the list further comprises a second indicator indicating at least one network address of a user equipment 8a,8b,8c comprised by the plurality of user equipment to which the call made to the one of the plurality of network addresses is to be routed in case the UMA/GAN mobile telecommunications device 8b is determined to be outside the home area.

In FIG. 1 the network 2 comprises a Graphical User Interface (GUI) 16 associated with the service control entity 14. The UMA/GAN-subscriber B may access the GUI 16, e.g. via a, preferably secure, internet connection. The UMA/GAN-subscriber may, using the GUI 16, control, set and/or modify the first indicator FI and the second indicator SI. The UMA/GAN-subscriber B may for instance set the first and second indicators as in the exemplary table I

TABLE I

| Indicator | In/Out home area | Call made to | Route call to |
|---|---|---|---|
| FI | In | 8a | 8a |
| FI | In | 8b | 8a |
| FI | In | 8c | 8a |
| SI | Out | 8a | 8b |
| SI | Out | 8b | 8b |
| SI | Out | 8c | 8b |

The system 1 as described thus far may be used as follows.

The calling party A initiates a call to called party B by selecting one of the network addresses, e.g. dialing one of the telephone numbers, associated with the called party B. In this example, the call is initiated to the network address associated with the fixed telecommunications device 8a of the called UMA/GAN-subscriber B. The call is sent to the MSC 6 from the calling device 4 (arrow a1). The MSC 6 looks up location information relating to the UMA/GAN mobile telecommunications device 8a in the HLR 10 (a2,a3). It will be appreciated that the MSC 6 may additionally also look up subscription information in the HLR 10. Such subscription information may e.g. indicate whether or not the present UMA/GAN-subscriber is entitled to use the present functionality. In the following the UMA/GAN-subscriber is entitled to use the functionality.

Next, the MSC 6 determines where to route the call to. Thereto, the MSC 6 contacts the IN 12 (a4,a5). The IN 12 comprises the first and second indicators. In this example, the first and second indicators are set as given in table I. In this example, The MSC 6 forwards the location information to the IN 12. The IN, in this case the service control entity 14, determines whether said UMA/GAN mobile telecommunications device 8b is located within the home area or outside the home area. If the UMA/GAN mobile telecommunications device 8b is determined to be within the home area, the service control entity 14 determines that the call is to be routed according to the first indicator, i.e. in this case towards the fixed telecommunications device 8a. If the UMA/GAN mobile telecommunications device 8b is determined to be outside the home area, the service control entity 14 determines that the call is routed according to the second indicator, i.e. in this case towards the UMA/GAN mobile telecommunications device 8b.

In the above example, the UMA/GAN mobile telecommunications device 8b may connect to a Wireless Local Area Network (WLAN) device within the home area when inside the home area. Alternatively, the UMA/GAN mobile telecommunications device 8b may connect to a femtocell or picocell for mobile in home telephony. The femtocell or picocell makes use of the same Core Network as a Global System for Mobile Communications (GSM) Core Network. A difference is that a 'femtocell base station' or 'picocell base station' is used which is a standard basis station with a very limited coverage, used for In-Home communication. The Base Station uses a unique cell-ID (location information). This location information is also available within the HLR.

It will be appreciated that it is also possible that the location information relating to the UMA/GAN mobile telecommunications device 8b in the HLR 10 is updated on the basis of the UMA/GAN mobile telecommunications device 8b establishing communication with the WLAN device within the home area. If there is an Internet Protocol (IP) connection, there is coverage over Wide Area Network (WAN) and the location information of the HLR may be updated with a unique cell ID corresponding to the location of the WAN connection, e.g. corresponding to the home area. If there is no IP connection, e.g. in case of switching off the UMA/GAN mobile telecommunications device when at home, the HLR may store the last known cell ID It is also possible that, additionally or alternatively, the location of the UMA/GAN-subscriber is determined on the basis of the UMA client associated with the IMS/SIP device 8c of said UMA/GAN-subscriber being activated or deactivated. If the UMA client 8c is active, the service control entity 14 may determine that the UMA/GAN-subscriber is within the home area. Also the location information within the HLR may be updated accordingly.

In an elaborate embodiment, the first and/or second indicator may be set so as to route an incoming call to more than one device of the UMA/GAN-subscriber. Hence, it is possible to achieve parallel ringing of two or more of the devices.

If, in the above example, the telecommunications device to which the call is routed does not answer, the call may be forwarded to another one of the devices 8a,8b,8c. Whether or not this occurs, and the order in which the devices are routed to may be indicated in the first and/or second indicator.

If none of the devices 8a,8b,8c answers the call, the call may be forwarded to a common voicemail service. This provides the advantage that the UMA/GAN-subscriber may have all his voicemail messages made to one of his telecommunications devices 8a,8b,8c in one common voicemailbox.

Figure 2:
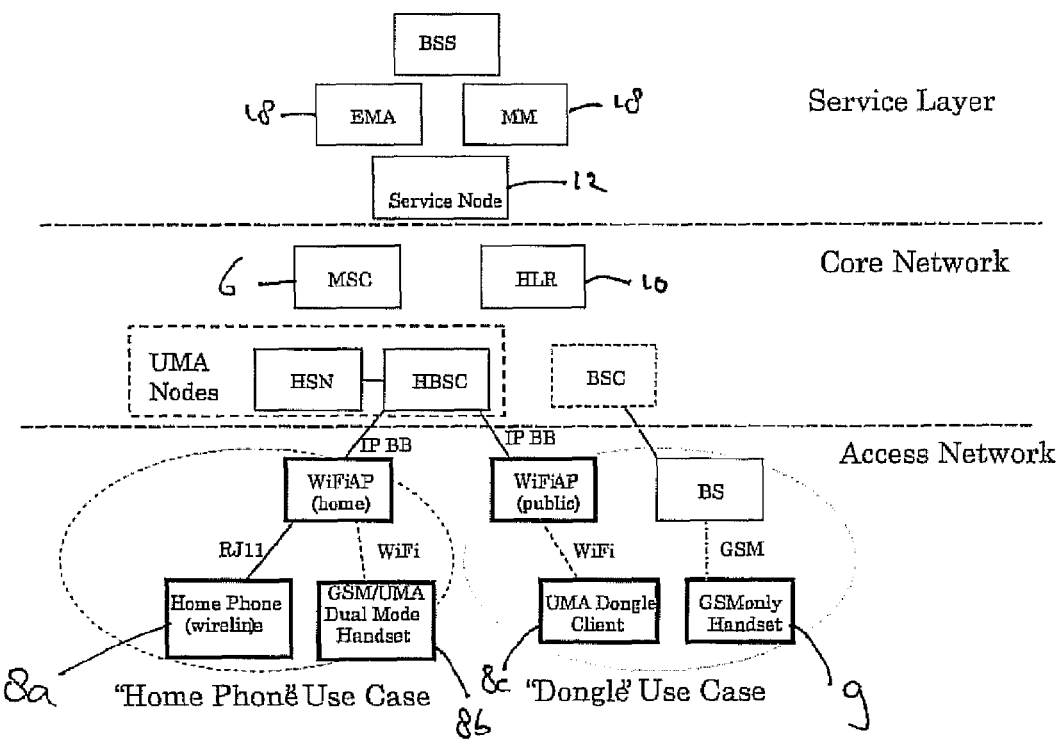
FIG. 2 shows a high level overview of network elements according to an embodiment of the invention.
Figure 3:
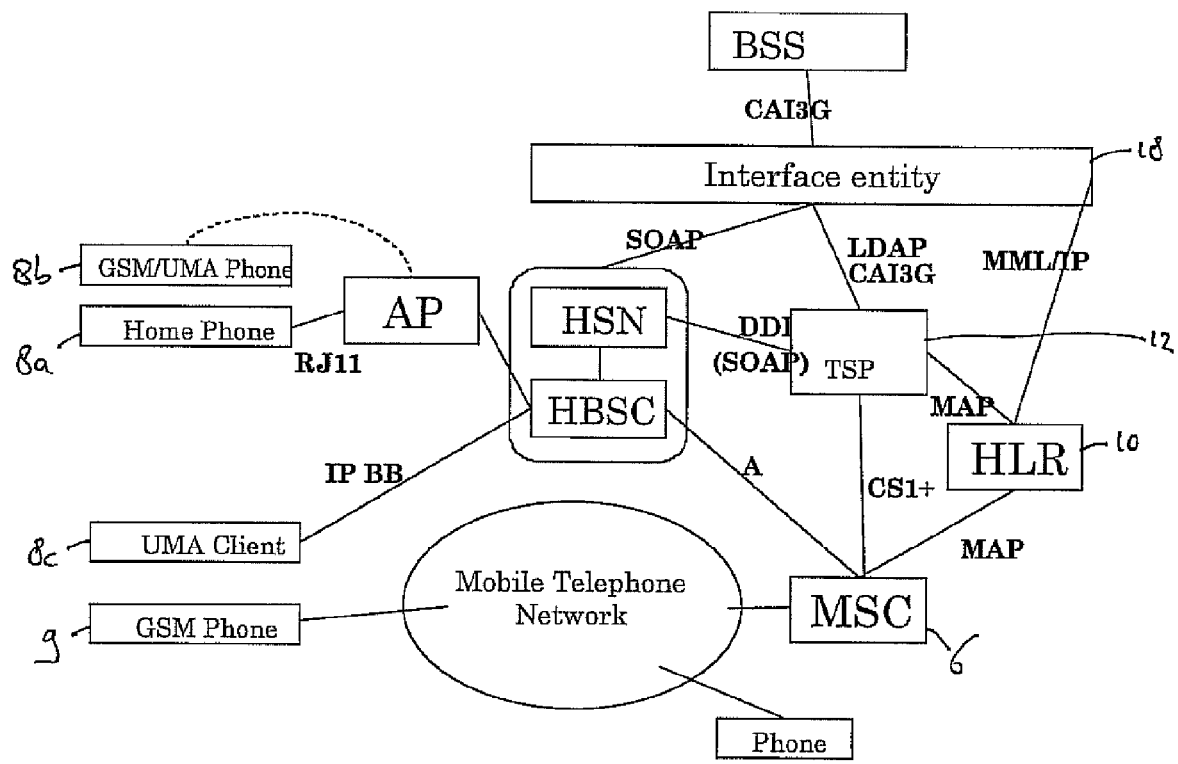
FIG. 3 shows an embodiment of an architecture according to the invention.

FIG. 2 shows a high level overview of network elements according to an embodiment of the invention. FIG. 3 shows an embodiment of an architecture according to the invention. Referring to the examples shown in FIGS. 2 and 3, the service node 12 is a server providing Intelligent Network capabilities. Examples of such service nodes are Ericsson's IN (Intelligenty Network) (TSP (Telecommunication Service Platform) or ECE (Ericsson Composition Engine)) platform, implementing the IN Service logic. The service node 12 may be connected to a Business Support System (BSS) of the network operator via an interface entity 18, e.g. using a Customer Administrative Interface 3$^{rd}$ Generation (CAI 3G). The interface entity may for example be an Ericsson Multi Activation (EMA) entity and/or a Multi Mediation (MM) entity.

In these examples the core network comprises a Mobile Switching Center (MSC) 6 and a Home Location Register 10. The UMA nodes contained in the Core Network comprise a Home Support Node (HSN) and a Home Base Station Controller (HBSC). In these examples is shown that the Core Network may also comprise a Base Station Controller for GSM applications.

In these examples, the Access Network comprises a WiFi (or other IEEE 802.11 compatible connection) Access Point (WiFiAP) within the Home area and a public WiFiAP.

In these examples, the UMA/GAN-subscriber possesses a UMA home phone 8a designed as a WiFi Access Point with RJ11 ports, Subscriber Identity Module (SIM) and individual MSISDNUMA (Mobile Station Integrated Services Digital Network/Unlicensed Mobile Access) Fixed telecommunications device, or as a telephone having a wired connection at the home area. The UMA home phone 8a may connect to the WiFiAP within the home area. In these examples, the UMA/GAN-subscriber further possesses a UMA/GAN mobile device 8b capable of connecting both via UMA and via GSM. When located within the home area, the UMA/GAN mobile device 8b may connect to the WiFiAP within the home area. In these examples, the UMA/GAN-subscriber further possesses a UMA client 8c, such as a dongle providing UMA capabilities to a PC or SIP phone. The PC or SIP phone may then connect to a public WiFiAP.

In the examples of FIGS. 2 and 3 also a GSM-only telephone 9 of the UMA/GAN-subscriber is shown, which may connect to the network via a Base Station (BS).

In the example of FIG. 1, the first and/or second indicator was controlled, set and/or modified by means of the user interface of the service control entity. Hence, the UMA/GAN-subscriber could for instance control, set and/or modify the first and/or second indicator himself. It is also possible that the first and/or second indicator is controlled, set and/or modified by the network operator and/or service provider.

The first and/or second indicator could be controlled, set and/or modified on the basis of a rule. It is for instance possible to route a call to one of the network addresses of the UMA/GAN-subscriber to the one of the devices 8a,8b,8c that has the littlest cost associated therewith, assuming that the called UMA/GAN-subscriber has to bear at least part of the costs of the incoming call. As such, the first and/or second indicators could be preset by the network operator and/or service provider. It is also possible that the service control entity is arranged for automatically determining the first and/or second indicator on the basis of a rule. Herein the service control entity may for instance take into account parameters such as fee changes, time of day, etc.

Figure 4:
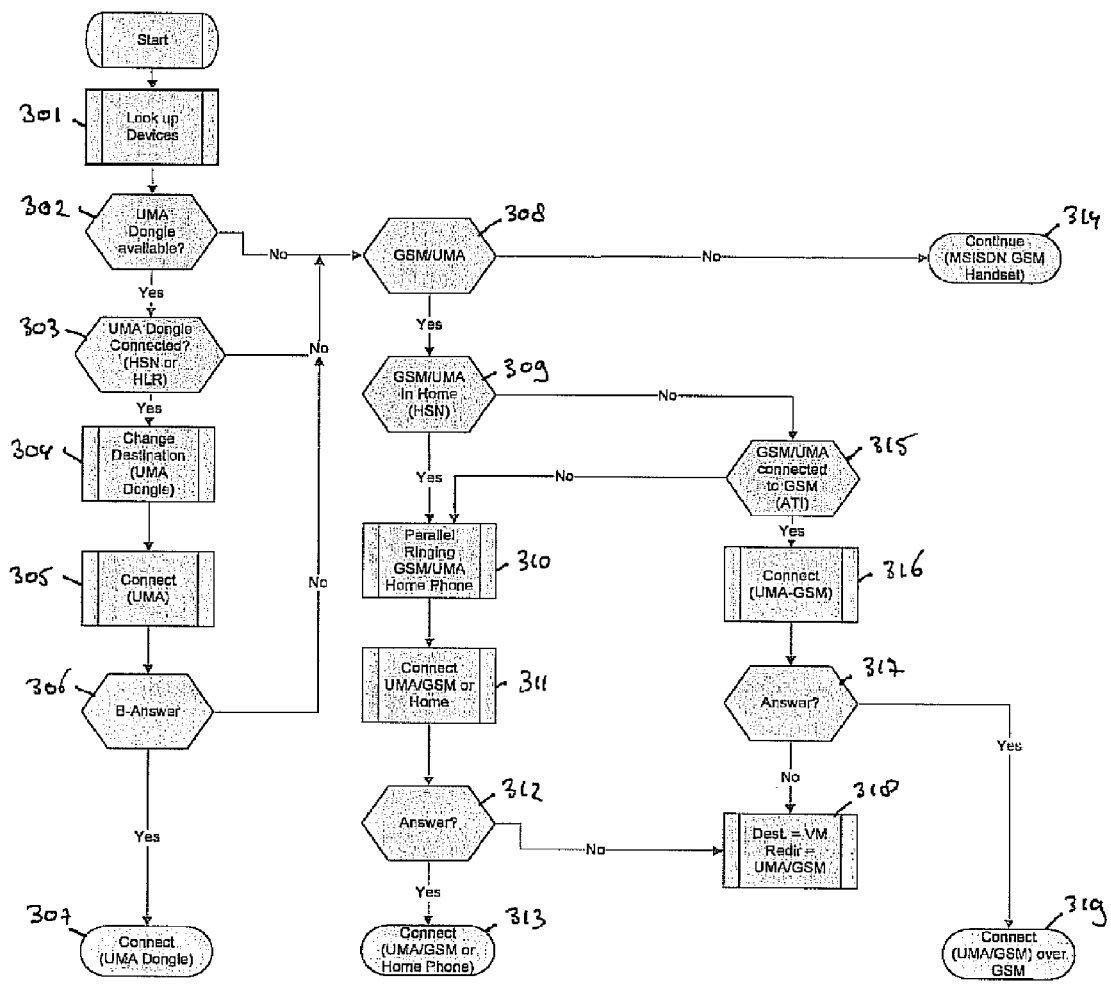
FIG. 4 shows a flow chart of a possible terminating call according to the invention.

FIG. 4 shows a flow chart of a possible terminating call according to the invention. In this example, the first and second indicators are set to be conditional. The conditions are indicated in simplified form in table II. It will be appreciated that further conditions may arise in case a device is ringing but is not answered.

TABLE II

| Indicator | In/Out home area | Condition | Call made to | Route call to |
| --- | --- | --- | --- | --- |
| FI | In | UMA client 8c active | 8a or 8b or 8c | 8c |
| FI | In | UMA client 8c inactive | 8a or 8b or 8c | 8a and 8b |
| SI | Out | UMA client 8c active | 8a or 8b or 8c | 8c |
| SI | Out | UMA client 8c inactive | 8a or 8b or 8c | 8b |

In the example of FIG. 4, the service control entity first checks 301 if the UMA/GAN-subscriber has the UMA Client 8c within his subscription. Next service control entity checks 302 if the UMA/GAN-subscriber has the UMA Client 8c connected.

Any call made to the home phone 8a, UMA/GSM device 8b or UMA client 8c will now be routed 303 to the UMA Client destination if the UMA Client is activated (by a separate procedure). The TSP (Application) may for instance request the Home Support Node HSN (e.g. over Simple Object Access Protocol (SOAP)) if the Dongle is connected, e.g. by checking whether there is WLAN coverage. If the UMA client is not available or not active, in this example the service control entity checks 308 whether UMA functionality is available for the subscriber. If not available, the call is routed 314 to the GSM telephone 9.

If the UMA functionality is available, in this example the service control entity checks 309 whether the UMA/GAN mobile device 8b is within the home area or outside the home area. The TSP may for instance request the HSN (over SOAP) if the UMA/GAN mobile device is connected via WLAN.

In this example, if the UMA/GAN mobile device 8b is determined to be within the home area, the call is routed 310-313 to the UMA/GSM mobile device 8b and the Home phone 8a in parallel. Thus, both the home phone 8a and the GSM/UMA/GAN mobile device 8b will ring simultaneously.

If, in this example, the UMA/GAN-subscriber is outside of the home area, incoming calls will be routed 315,316,317,319 to the subscribers UMA/GSM mobile device 8b.

If the UMA/GAN mobile device 8b is not connected, e.g. switched off, the HLR will be invoked by the TSP (e.g. AnyTimeInterrogation over MAP Protocol) to check the 'latest' location. If a 'normal' cellID (not a cell ID identifying WLAN Coverage) is returned, then the service control entity may determine the UMA/GAN-subscriber to be outside the home area.

In the example of FIG. 4 it can be seen that if a call is not answered by the device that the call was routed to, the call may be forwarded to another device.

Determining of the location of the UMA/GAN-subscriber may be performed as follows.

The HSN may be invoked by the IN service. If there is an IP connection, the UMA/GAN-subscriber may be classified as 'within home area'. If there is no IP connection, the HLR may be invoked to check the cell ID of the cell serving the UMA/GAN mobile device over GSM. If the cell ID identifies that the UMA/GAN mobile device 8b is within a serving cell with a cell ID associated with a 'home area cell' overlapping with the predetermined home area, then the subscriber may be identified as "within home area, but no UMA connection". If the cell ID identifies that the subscriber is not in his/her home area cell, the user may be identified as 'Outside of Home area'.

In the example of FIG. 4 all devices 8a,8b,8c,9 have one common Voice Mailbox, i.e. one Voice Mail Deposit Number (VMDN) and one Voice Mail Retrieval Number (VMRN) for the separate Mobile Subscriber Integrated Services Digital Network (ISDN) Numbers (MSISDN's) of the respective devices. This is carried out by monitoring the call and in case of an unsuccessful call set-up routing the call towards the Common Voice Mail destination number and filling the Redirecting number with the User Identity (e.g. Destination may be the UMA GSM Voicemail (VM) number, Redirecting Number may be the UMA GSM MSISDN).

Figure 5:
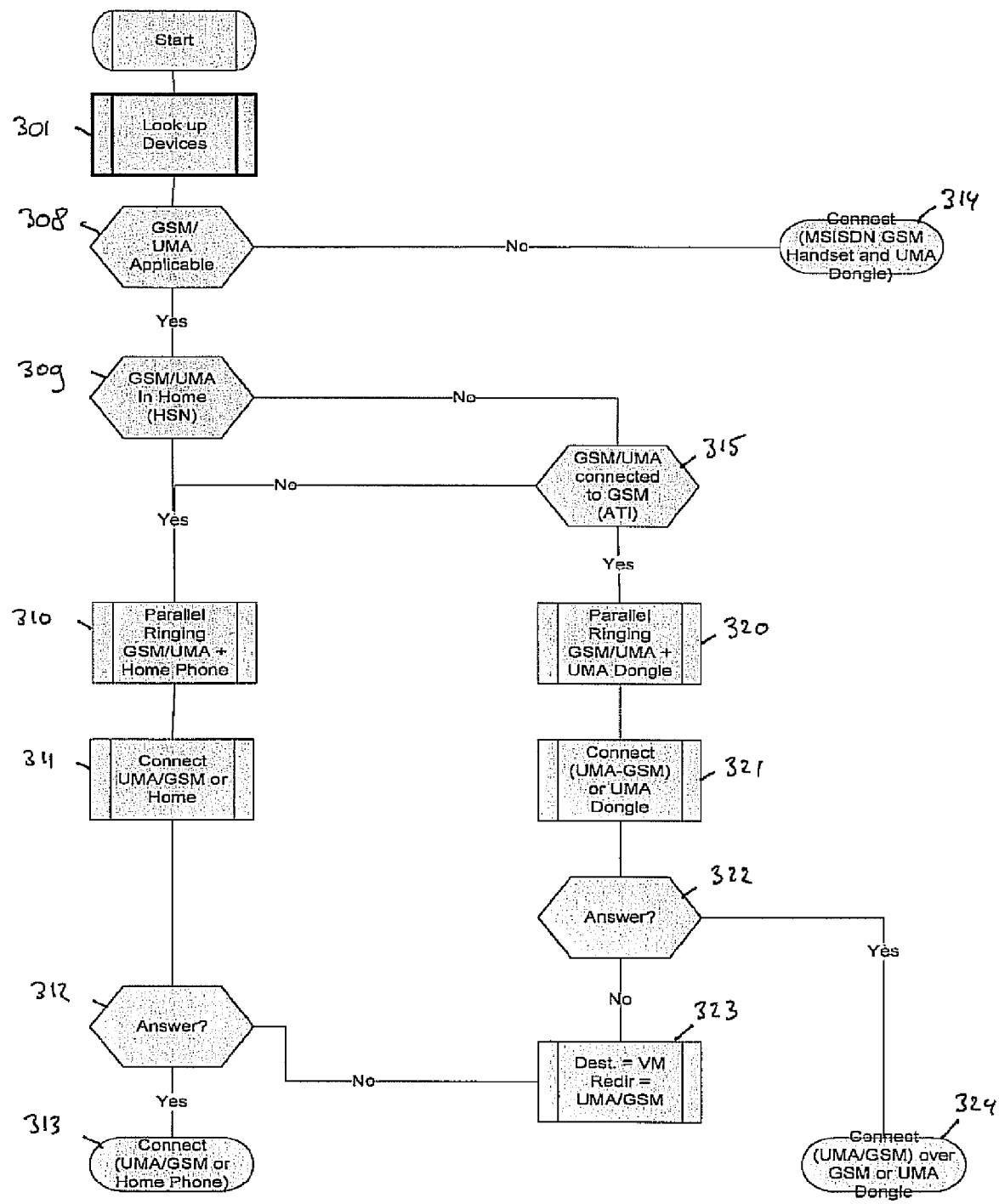
FIG. 5 shows a flow chart of an alternative terminating call according to the invention.

FIG. 5 shows a flow chart of an alternative terminating call according to the invention. In this example, the service control entity does not start by checking (302,303) for the UMA client, but starts with checking 308 whether UMA functionality is available for the subscriber, e.g. by checking whether the subscriber has UMA Dongle connectivity, and if the UMA functionality is available, checking 309 whether the UMA/GAN mobile device 8b is within the home area or outside the home area.

In the example of FIG. 5, in the event the UMA/GSM mobile device 8b is outside the home area, the incoming call is routed 320 to the UMA/GSM mobile device 8b over GSM and to the UMA client 8c (if activated) in parallel. The UMA/GSM mobile device 8b and the UMA client device 8c will now ring in parallel.

Figure 6:
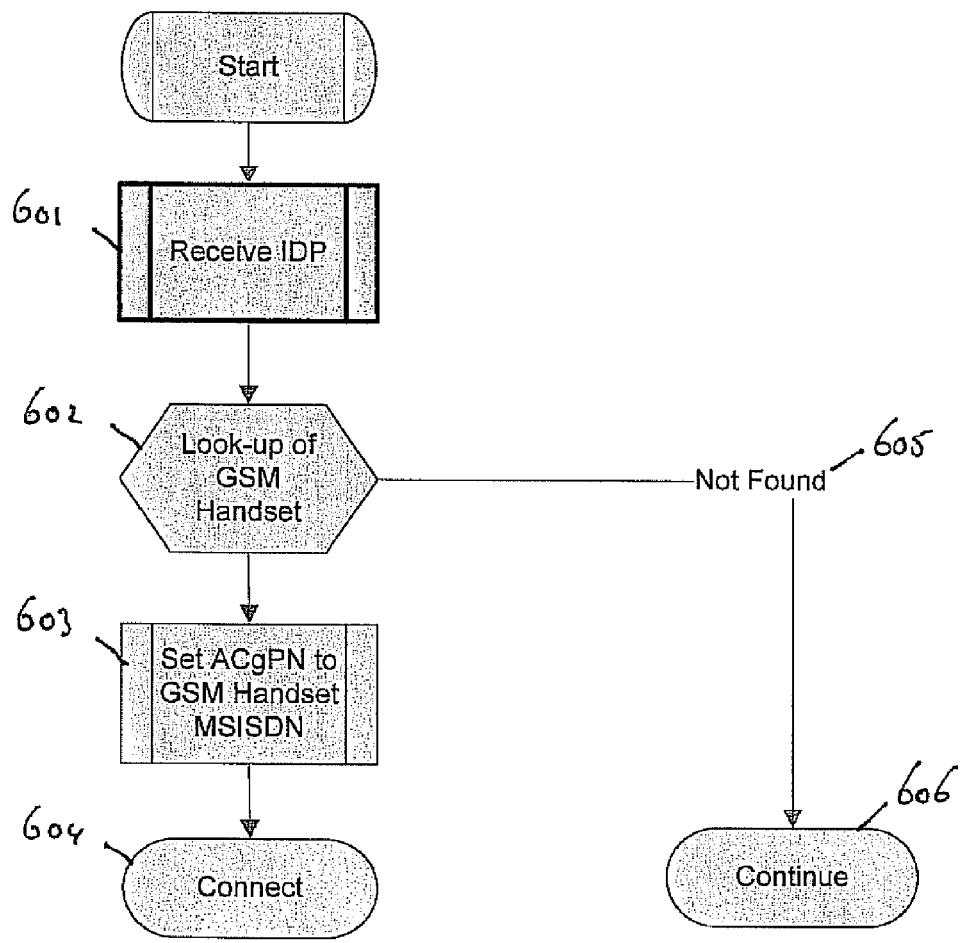
FIG. 6 shows a flow chart of a possible originating call according to the invention.

FIG. 6 shows a flow chart of a possible originating call according to the invention.

An IN Service provides UMA/GAN-subscribers the possibility to display the GSM Handset MSISDN when setting up a call via the UMA Client. It is possible to specify that a particular International Mobile Subscriber Identity (IMSI) (in this case the IMSI of the UMA Client) can use any Access Point (AP) for access. The Originating UMA Service is triggered based on subscription information of the mobile subscriber (Originating Intelligent Network Category Key (OICK)) with a defined service key for the originating case. After invocation of the UMA service (IDP), a look-up 602 of the belonging GSM Handset MSISDN will be performed. A call set-up will be established (Connect 604) with the GSM Handset MSISDN as Presented Number (Additional Calling Party Number) 603 and with Calling Line Identity Presented (CLIP).

In the foregoing specification, the invention has been described with reference to specific examples of embodiments of the invention. It will, however, be evident that various modifications and changes may be made therein without departing from the broader spirit and scope of the invention as set forth in the appended claims.

In the examples, a UMA/GAN mobile user equipment is mentioned, connecting to a Wireless Local Area Network (WLAN) device within the home area when inside the home area. Alternatively, or additionally, a mobile user equipment 8b may connect to a femtocell or picocell for mobile in home telephony when within the home area. The femtocell or picocell makes use of the same Core Network as a GSM Core Network. A difference is that a 'femtocell base station' or 'picocell base station' is used which is a standard basis station with a very limited coverage, used for In-Home communication. The Base Station uses a unique cell-ID (location information). This location information is also available within the HLR.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method of routing a call to one of a plurality of pieces of user equipment, the plurality of pieces of user equipment being associated to an Unlicensed Mobile Access Global Access Networks (UMA/GAN)-subscriber in a telecommunications network, wherein each user equipment has a corresponding network address and one of the network addresses corresponds to an UMA/GAN mobile user equipment of the plurality of pieces of user equipment, the method comprising a service control entity comprised by the telecommunications network performing the steps of:

storing a list associated with the UMA/GAN-subscriber, the list comprising a home area cell identifier representing a cell area overlapping a predetermined home area associated with the UMA/GAN-subscriber;

receiving location information relating to a location of the UMA/GAN mobile user equipment; determining whether the UMA/GAN mobile user equipment is located within the home area or outside the home area;

wherein the list further comprises a first indicator indicating at least one network address of a first user equipment of the plurality of pieces of user equipment to which the call is to be routed when the UMA/GAN mobile user equipment is determined to be within the home area, and a second indicator indicating at least one network address of a second user equipment of the plurality of pieces of user equipment to which the call is to be routed when the UMA/GAN mobile user equipment is determined to be outside the home area; wherein the first and second indicators are conditional on a UMA/GAN condition, and wherein the first user equipment is distinct from the second user equipment; causing the call to be routed the first user equipment based on the first indicator when the mobile user equipment is determined to be within the home area; causing the call to be routed to the second user equipment based on the second indicator when the mobile user equipment is determined to be outside the home area; and wherein the UMA/GAN-subscriber possesses a UMA client, wherein the first and second indicators are conditional upon the UMA client being active or inactive.

2. The method of claim 1 further comprising the UMA/GAN-subscriber performing at least one of:
setting at least one of the first and second indicators;
modifying at least one of the first and second indicators.

3. The method of claim 2 wherein the service control entity comprises a user interface; wherein the method further comprises at least one of:
setting at least one of the first and second indicators via the user interface;
modifying at least one of the first and second indicators via the user interface.

4. The method of claim 1 wherein the service control entity automatically determines at least one of the first and second indicators based on a rule.

5. The method of claim 1 wherein the telecommunications network comprises a mobile in-home telephony entity proximate the home area.

6. The method of claim 5:
wherein the service control entity receives the location information from a switching node or a location server of the telecommunications network, or from the in-home telephony entity;
wherein the location information comprises a serving cell identifier of a cell serving the UMA/GAN mobile user equipment.

7. The method of claim 1 wherein the step of determining whether the UMA/GAN mobile user equipment is located within the home area or outside the home area comprises comparing the stored home area cell identifier and a serving cell identifier.

8. The method of claim 1 wherein at least one of the first and second indicators indicates to route the call to more than one user equipment of the plurality of the user equipment in parallel and/or sequentially.

9. The method of claim 1 further comprising the service control entity assuming that the location of the UMA/GAN mobile user equipment is identical to the last known location of the UMA/GAN mobile user equipment.

10. A service control entity for providing intelligent network services to an Unlicensed Mobile Access Global Access Networks (UMA/GAN)-subscriber in a telecommunications network, the UMA/GAN-subscriber having a plurality of pieces of user equipment, wherein each user equipment has a corresponding network address and one of the network addresses corresponds to a UMA/GAN mobile user equipment of the plurality of pieces of user equipment, the service control entity comprising:
a processing circuit; an input unit connected to the processing circuit; an output unit connected to the processing circuit;
wherein the processing circuit is configured to:
store a list associated with the UMA/GAN-subscriber, the list comprising a home area cell identifier representing a cell area overlapping a predetermined home area associated with the UMA/GAN-subscriber;
receive location information relating to a location of the UMA/GAN mobile user
equipment; determine whether the UMA/GAN mobile user equipment is located within the home area or outside the home area;
wherein the list further comprises a first indicator indicating at least one network address of a first user equipment of the plurality of pieces of user equipment to which the call is to be routed when the UMA/GAN mobile user equipment is determined to be within the home area, and a second indicator indicating at least one network address of a second user equipment of the plurality of pieces of user equipment to which the call is to be routed when the UMA/GAN mobile user equipment is determined to be outside the home area; wherein the first and second indicators are conditional on a UMA/GAN condition, and wherein the first user equipment is distinct from the second user equipment; and wherein the UMA/GAN-subscriber possesses a UMA client, wherein the first and second indicators are conditional upon the UMA client being active or inactive.

11. The service control entity of claim 10 further comprising a user interface for setting and/or modifying at least one of the first and second indicators.

12. The service control entity of claim 10 wherein the processing circuit is further configured to automatically determine at least one of the first and second indicators based on a rule.

13. A mobile telecommunication network for providing network services to an Unlicensed Mobile Access Global Access Networks (UMA/GAN)-subscriber in the telecommunications network, the UMA/GAN-subscriber having a plurality of pieces of user equipment, wherein each user equipment has a corresponding network address and one of the network addresses corresponds to a UMA/GAN mobile user equipment of the plurality of pieces of user equipment, the network comprising:
a service control entity comprising: a processing circuit; an input unit connected to the processing circuit; an output unit connected to the processing circuit; wherein the processing circuit is configured to:
store a list associated with the UMA/GAN-subscriber, the list comprising a home area cell identifier representing a cell area overlapping a predetermined home area associated with the UMA/GAN-subscriber;
receive location information relating to a location of the UMA/GAN mobile user
equipment; determine whether the UMA/GAN mobile user equipment is located within the home area or outside the home area;
wherein the list further comprises a first indicator indicating at least one network address of a first user equipment of the plurality of pieces of user equipment to which the call is to be routed when the UMA/GAN mobile user equipment is determined to be within the home area, and a second indicator indicating at least one network address of a second user equipment of the plurality of pieces of user equipment to which the call is to be routed when the UMA/GAN mobile user equipment is determined to be outside the home area; wherein the first and second indicators are conditional on a UMA/GAN condition, and wherein the first user equipment is distinct from the second user equipment; and wherein the UMA/GAN-subscriber possesses a UMA client, wherein the first and second indicators are conditional upon the UMA client being active or inactive.

14. The telecommunications network of claim 13 further comprising a mobile in-home telephony entity proximate the home area.

15. A computer program product stored in a non-transient media, the computer program product including software code portions configured to, when run on a programmable apparatus, to implement the steps of:
storing a list associated with an Unlicensed Mobile Access Global Access Networks (UMA/GAN)-subscriber, the list comprising a home area cell identifier representing a cell overlapping a predetermined home area associated with the UMA/GAN-subscriber; wherein the UMA/GAN-subscriber has a plurality of pieces of user equipment; wherein each user equipment has a corresponding network address and one of the network addresses corresponds to a UMA/GAN mobile user equipment of the plurality of pieces of user equipment; wherein the list further comprises a first indicator indicating at least one network address of a first user equipment of the plurality of pieces of user equipment to which a call made to one of the plurality of network addresses is to be routed when the UMA/GAN mobile user equipment is determined to be within the home area, and a second indicator indicating at least one network address of a user equipment of the plurality of pieces of user equipment to which a call made to one of the plurality of network addresses is to be routed when the UMA/GAN mobile user equipment is determined to be outside the home area; wherein the first and second indicators are conditional on a UMA/GAN condition, and wherein the first user equipment is distinct from the second user equipment; receiving location information relating to a location of the UMA/GAN mobile user equipment; determining whether the UMA/GAN mobile user equipment is located within the home area or outside the home area; determining whether the UMA/GAN condition is met; and wherein the UMA/GAN-subscriber possesses a UMA client, wherein the first and second indicators are conditional upon the UMA client being active or inactive.

\* \* \* \* \*